US005389466A

United States Patent [19]

Inoue et al.

[11] Patent Number: 5,389,466

[45] Date of Patent: Feb. 14, 1995

[54] BATTERY TERMINAL

[75] Inventors: Nori Inoue; Athushi Sakatani, both of Yokkaichi, Japan

[73] Assignee: Sumitomo Wiring Systems, Ltd., Yokkaichi, Japan

[21] Appl. No.: 78,119

[22] Filed: Jun. 18, 1993

[30] Foreign Application Priority Data

Jun. 23, 1992 [JP] Japan .............................. 4-043602[U]

[51] Int. Cl.[6] .............................................. H01M 2/30

[52] U.S. Cl. ..................................... 429/178; 439/761

[58] Field of Search ................ 429/178, 179; 439/761; H01M 2/30

[56] References Cited

U.S. PATENT DOCUMENTS 1,681,673 8/1928 Merideth .
2,819,455 1/1958 McCray .
4,555,159 11/1985 Chartrain et al. .

FOREIGN PATENT DOCUMENTS 2636783 3/1990 France .
2239084 2/1974 Germany ............................ 429/178
2725422 3/1978 Germany ............................ 429/178
4-14863 4/1992 Japan .
727351 2/1953 United Kingdom .

OTHER PUBLICATIONS

English language abstract of Japanese Utility Model No. 4-14863.

*Primary Examiner*—John S. Maples
*Attorney, Agent, or Firm*—Sandler Greenblum & Bernstein

[57] ABSTRACT

A battery terminal comprising: a main body and a lever which is pivotal and has a bearing portion cam-shaped and supported on the lever-holding portion. The main body comprises: an annular electrode-engaging portion into which a battery post is inserted; first and second tightening plates continuous with an open free end of the electrode-engaging portion; an electric wire-connecting portion continuous with either of the first tightening plate and the second tightening plate or a circular portion of the electrode-engaging portion; a lever-holding portion, continuous with the first tightening plate, projecting toward the second tightening plate, thus closing the free end of the electrode-engaging portion and pressing the electrode-engaging portion against the battery post.

5 Claims, 4 Drawing Sheets

BATTERY TERMINAL

BACKGROUND OF THE INVENTION

1. Field of the Invention

The present invention relates to a battery terminal to be installed on the electrode (battery post) of a battery mounted on an automobile or the like, and more particularly to the battery terminal to be fixed to the battery post not by a bolt and a nut to be tightened by a tightening tool but by a lever.

2. Description of the Related Arts

As shown in FIG. 6, a battery post projecting upward from the upper surface of a battery is inserted into an electrode-engaging portion 3a of a battery terminal 3. A bolt 4 is horizontally inserted into a bolt opening of a substrate 3b and that of a tightening plate 3c. A nut 6 is tightened horizontally on the bolt 4 with an impact wrench 5 disposed horizontally. Then, the electrode-engaging portion 3a is pressed against the battery post 2 to fix the battery terminal 3 to the battery post 2.

In recent years, parts are installed in the engine room of the automobile in a high density. For example, projections such as an air duct higher than the battery post 2 or electric wires are installed in the periphery of the battery 1. In tightening the nut 6 on the bolt 4 with the bolt 4 and the impact wrench 5 disposed horizontally, the following problems occur: The impact wrench 5 may contact other parts and thus it is difficult to tighten the nut 6 on the bolt 4 or it is impossible to tighten the nut 6 thereon if there is no space in which the impact wrench 5 is placed horizontally.

If the impact wrench 5 and other parts interfere with each other while the plus side of the battery post 2 is being tightened, a short circuit occurs when the impact wrench 5 interferes with the minus side thereof. A fire may occur in the automobile. Therefore, it is necessary to alter the configurations of other parts so as to prevent the interference between the impact wrench 5 and other parts.

In order to overcome the above-described problems, a battery terminal of lever type not using a bolt has been proposed. The battery terminal disclosed in Japanese Laid-Open Utility Model Publication No. 4-14863 is described below with reference to FIGS. 7A and 7B. A terminal main body 3' comprises two component parts, namely, annular first component parts 3'a having a semicircular electrode-engaging portion in one side thereof and second component parts 3'b having a circular arc portion in one side thereof. The battery terminal is assembled as follows: A shaft 7 installed on the second component parts 3'b is inserted into a long groove 3'a-1 of the first component parts 3'a; one end of each of a pair of links 8 and 8 is fixed to each end of the shaft 7; a connecting rod 9 is fixed to the other end of each link 8; and both ends of the connecting rod 9 are locked by a cover 10.

In the above-described battery terminal, the cover 10 is pivoted on the connecting rod 9 to allow the semicircular portion of the first component parts 3'a and the circular arc portion of the second component parts 3'b to be close to each other so that a battery post is sandwiched therebetween.

In the above-described battery terminal, the battery post is fixed not by using a bolt and nut to be tightened on the bolt by a tool, but by pressing the cover 10 downward. But the construction of the battery terminal is complicated in that it is necessary to use the link, the connecting rod, and a large number of component parts to compose the battery terminal. Thus, manufacturing cost of the battery terminal is high. Moreover, many processes are required to assemble the battery terminal from the component parts and thus it takes much time and labor to assemble the battery terminal.

SUMMARY OF THE INVENTION

It is an object of the present invention to provide a one-piece compact battery terminal, of a simple construction composed of a small number of component parts, which can be easily fixed to a battery post in a small number of processes by the use of a lever rotatably supported on a terminal main body and pressed by hand so that an electrode-engaging portion of the terminal main body is pressed against the battery post.

In accomplishing these and other objects of the present invention, there is provided a battery terminal comprising: a main body and a lever which is pivotal and has a bearing portion cam-shaped and supported on the lever-holding portion. The main body comprises: an annular electrode-engaging portion into which a battery post is inserted; first and second tightening plates continuous with an open free end of the electrode-engaging portion; an electric wire-connecting portion continuous with either of the first tightening plate and the second tightening plate or a circular portion of the electrode-engaging portion; a lever-holding portion, continuous with the first tightening plate, projecting toward the second tightening plate. In this construction, the bearing portion of the lever has a first side and a second side. The distance between the pivotal axis of the lever and the first side is shorter than the distance between the pivotal axis of the lever and the second side. The second side presses the second tightening plate toward the first tightening plate due to the pivotal motion of the lever, thus closing the free end of the electrode-engaging portion and pressing the electrode-engaging portion against the battery post.

The lever-holding portions of the main body extends horizontally from the upper and lower ends of the first tightening plate beyond the upper and lower end of the second tightening plate. The lever is sectionally U-shaped in one end portion thereof to form the bearing portion comprising the upper half and the lower half. The bearing portion is inserted into the space between the lever-holding portion and supported on the lever-holding portion by means of a bolt and a nut so that the lever is pivotal about the bolt. The bearing portion has a curved first side disposed in a rear corner of the bearing portion and a second side adjacent to the first side. A predetermined gap is provided between the first and second tightening plates when the first side is in contact with the outer vertical surface of the second tightening plate. When the second side is brought into contact with the second tightening plate, the second tightening plate is pressed toward the first tightening plate.

According to the construction of the battery terminal of the present invention, the gap is provided between the first tightening plate and the second tightening plate. Therefore, the battery post can be easily inserted into the electrode-engaging portion of the main body and thus the battery terminal can be easily fixed to the battery post with the free end of the electrode-engaging portion open.

After the battery post is inserted into the electrode-engaging portion of the main body, the lever is pressed to pivot the lever. The distance between the pivotal axis of the lever and the first side is shorter than the distance between the pivotal axis of the lever and the second side. Therefore, when the second side of the bearing portion is brought into contact with the second tightening plate, the lever presses the second tightening plate toward the first tightening plate, thus closing the free end of the electrode-engaging portion continuous with the first and second tightening plates. In this manner, the electrode-engaging portion reliably tightens the battery post.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
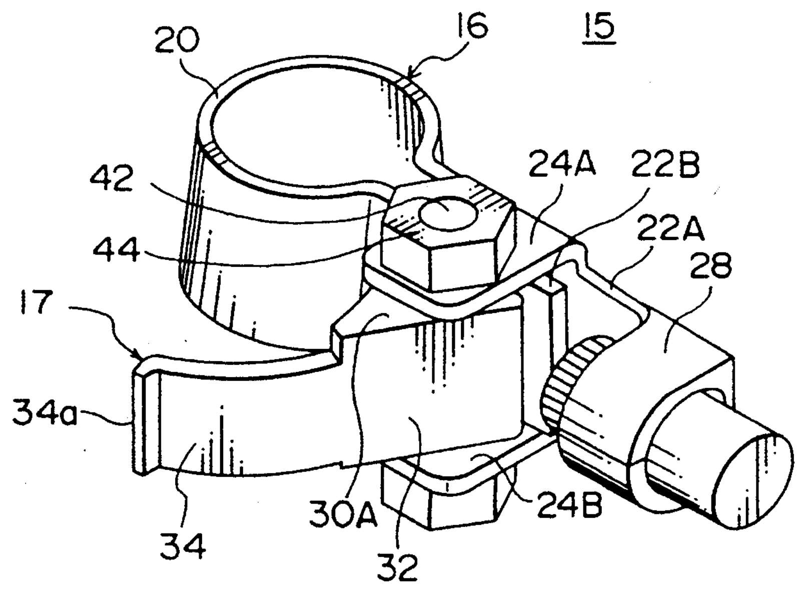
FIG. 1 is a perspective view showing a battery terminal according to a first embodiment of the present invention.

Before the description of the present invention proceeds, it is to be noted that like parts are designated by like reference numerals throughout the accompanying drawings.

A battery terminal according to the first embodiment of the present invention is described below with reference to FIGS. 1 through 4. A battery terminal 15 shown in FIG. 1 comprises a main body 16 and a tightening lever 17 both made of metal. As shown in FIGS. 3, the lever 17 is rotatably mounted on one side of the main body 16 and in approximately the center thereof by means of a bolt 42 and a nut 44, as will be described later.

A metal plate is bent to form the main body 16. The main body 16 comprises an annular electrode-engaging portion 20, disposed in the front end portion thereof, for tightening the battery terminal 2. The electrode-engaging portion 20 is open in the rear end thereof to insert the battery post 2 thereinto easily.

Figure 3A:
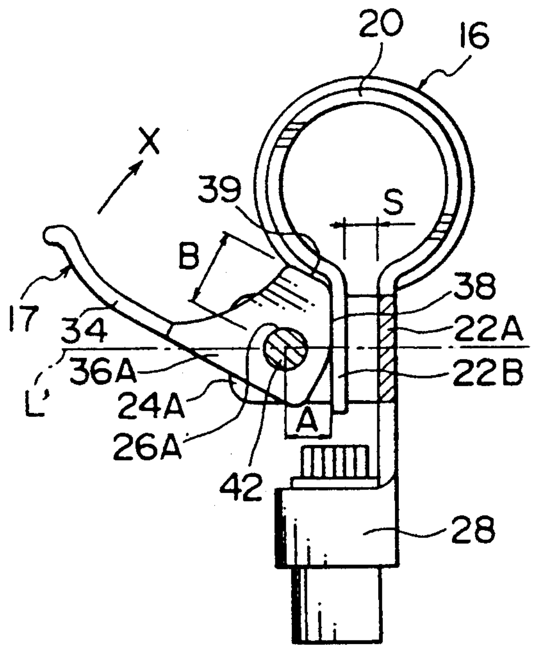
FIGS. 3A and 3B are explanatory views illustrating the operation of the battery terminal according to the first embodiment.

Flat first and second tightening plates 22A and 22B continuous with the electrode-engaging portion 20 extend from the open free end of the electrode-engaging portion 20, with a predetermined gap (S) provided between the first and second tightening plates 22A and 22B opposed to each other as shown in FIG. 3A.

A pair of lever-holding portions 24A and 24B, continuous with the first tightening plate 22A disposed in the right of FIG. 1, extend horizontally from the upper and lower end of the first tightening plate 22A toward the left in FIG. 1 beyond the upper and lower end of the second tightening plate 22B, respectively.

Bolt openings 26A and 26B are formed on the lever-holding portions 24A and 24B, respectively with a distance (A) spaced from the outer vertical surface of the second tightening plate 22B as shown in FIG. 3A.

An electrode-connecting portion 28 continuous with the first tightening plate 22A extends from the rear end thereof. The electrode-connecting portion 28 is of crimping type in the first embodiment. The barrel of the electrode-connecting portion 28 faces the second tightening plate 22B.

In the above-described construction of the electrode-connecting portion 28, the electrode-connecting portion 28 and the lever-holding portions 24A and 24B extend in the same direction. Therefore, one metal plate can be effectively used as a material of the main body 16.

One end of a base portion 32 of the lever 17 is denoted as an operation portion 34. The upper and lower ends of the base portion 32 are bent in the other end thereof to form a pair of cam-shaped bearing portions 30A and 30B. Therefore, the lever 17 is sectionally U-shaped in the base portion 32 thereof. The bearing portions 30A and 30B are pivotally mounded in the space between the lever-holding portions 24A and 24*b* of the main body 16.

The operation portion 34 is curved to conform to the electrode-engaging portion 20 which is circular. A projection 34*a* is formed on the leading end of the operation portion 34 so as to easily untighten the lever 17 from the main body 16.

Figure 2:
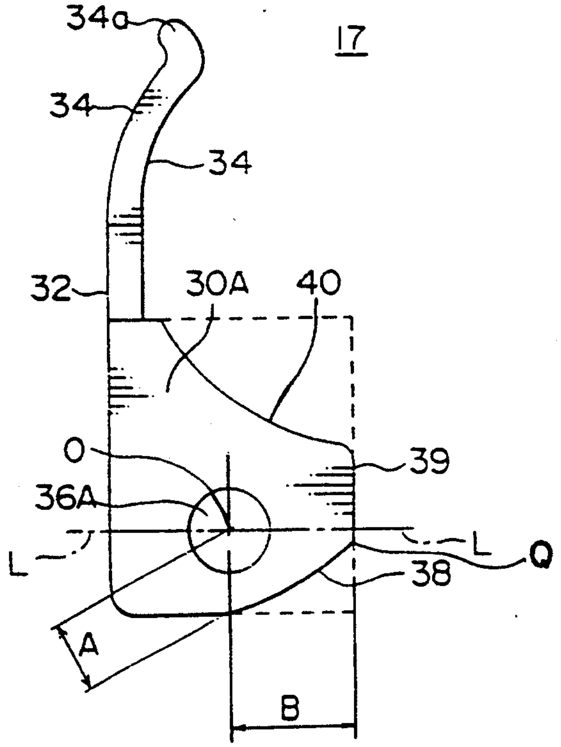
FIG. 2 is a plan view showing a lever according to the first embodiment of the present invention.

Bolt openings 36A and 36B are formed on each of the bearing portions 30A and 30B of the lever 17. The bearing portions 30A and 30B have a curved first side formed in a rear corner of the bearing portion and a straight second side adjacent to the first side, thus having a cam-shaped configuration. The distance (A) shown in FIG. 2 is the length of the perpendicular drawn from the center of each of the bolt openings 36A and 36B, namely, the pivotal axis (O) of the lever 17 to the first side 38. The distance (B) shown in FIG. 2 is the length of the perpendicular drawn from the pivotal—axis (O) of the lever 17 to the second side 39 of each of the bearing portions 30A and 30B. The distance (A) is shorter than the distance (B).

The intersection (Q) of the first side 38 and the second side 39 is rearward of the perpendicular drawn from the pivotal axis (O) of the lever 17 to the second side 39.

The side, of the bearing portions 30A and 30B, opposed to the first side 38 is formed as a circular portion 40 in conformity with the electrode-engaging portion 20 which is circular.

The bearing portions 30A and 30B of the lever 17 are inserted into the space between the lever-holding portions 24A and 24*b* of the main body 16, and the nut 44 is tightened on the bolt 42 inserted into the bolt openings 26A and 26B of the lever-holding portions 24A and 24*b* and the bolt openings 36A and 36B of the bearing portions 30A and 30B so that the lever 17 is rotatable about the pivotal axis (O).

When the lever 17 has been mounted on the main body 16 with the first side 38 of each of the bearing portions 30A and 30B in contact with the outer vertical surface of the second tightening plate 22B, the first and second tightening plates 22A and 22B are spaced from each other in the predetermined interval (S) as shown in FIG. 3A, as described previously.

The operation of installing the battery terminal 15 on the battery post 2 is described below.

The battery post 2 is inserted into the electrode-engaging portion 20 of the battery terminal 15 with the lever 17 held in the state shown in FIG. 3A. Since the free end of the electrode-engaging portion 20 is open, the battery post 2 can be easily inserted into the electrode-engaging portion 20.

Then, the lever 17 is pivoted in the direction shown by (X), namely, clockwise about the bolt 42.

As a result, the second tightening plate 22B which has been in contact with the first side 38 of the bearing portions 30A and 30B is brought into contact with the second side 39 thereof. Consequently, the second tightening plate 22B is pressed by the second side 39 toward the first tightening plate 22A because the distance (B) between the pivotal axis (O) of the lever 17 and the second side 39 is longer than the distance (A) between the pivotal axis (O) and the first side 38 as described previously.

Figure 3B:
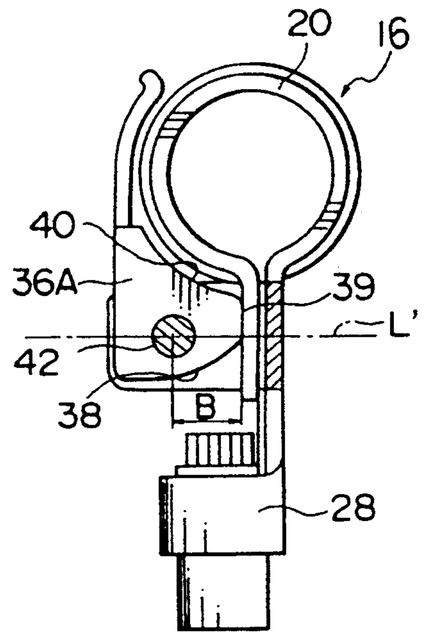

When the intersection (Q) of the first side 38 and the second side 39 is at a change point, i.e., when the intersection (Q) is on the perpendicular drawn from the pivotal axis (O) to the second tightening plate 22B during the pivotal motion of the lever 17, the greatest force is required to press the lever 17 at the change point. At this time, the distance between the first and second tightening plates 22A and 22B is zero. When the intersection (Q) passes the change point, the entire second side 39 is brought into contact with the outer vertical surface of the second tightening plate 22B as shown in FIG. 3B. In this manner, the battery terminal 15 is fixed to the battery post 2 with a slight gap provided between the first and second tightening plates 22A and 22B. In order to untighten the lever 17 from the main body 16, it is necessary to apply force to the lever 17 so that the intersection (Q) of the first side 38 and the second side 39 passes the change point. Therefore, the lever 17 can be securely held in the tightening position shown in FIG. 3B.

Figure 4:
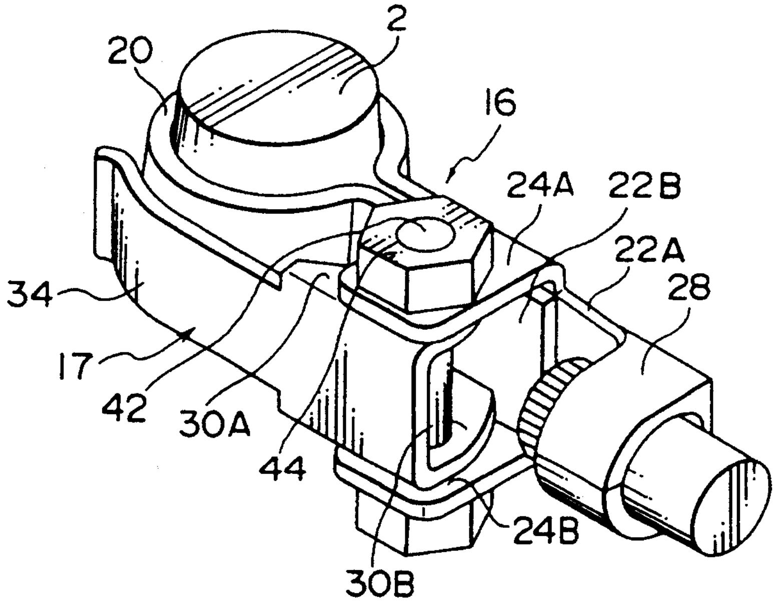
FIG. 4 is a perspective view showing the state in which the battery terminal according to the second embodiment has been fixed to a battery post.

Owing to the pivotal motion of the lever 17, the second tightening plate 22B is pressed toward the first tightening plate 22A and consequently, the open free end of the electrode-engaging portion 20 is closed. In this manner, the electrode-engaging portion 20 is pressed against the battery post 2 as shown in FIG. 4.

Figure 5:
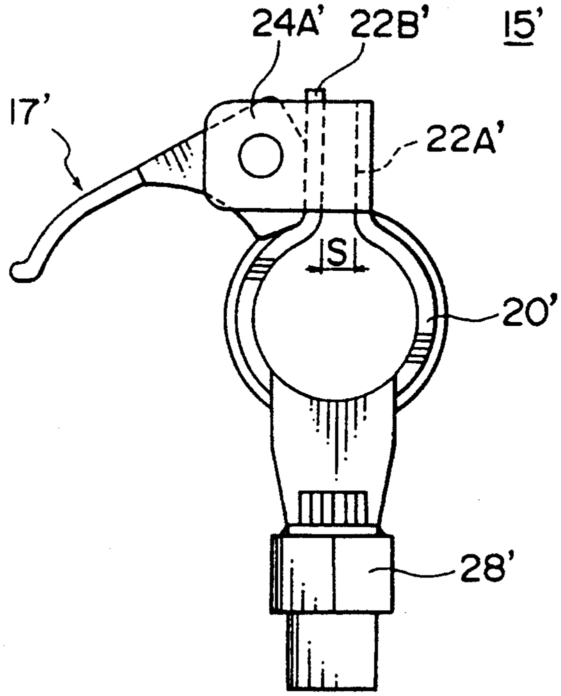
FIG. 5 is a plan view showing a battery terminal according to a second embodiment of the present invention.
Figure 6:
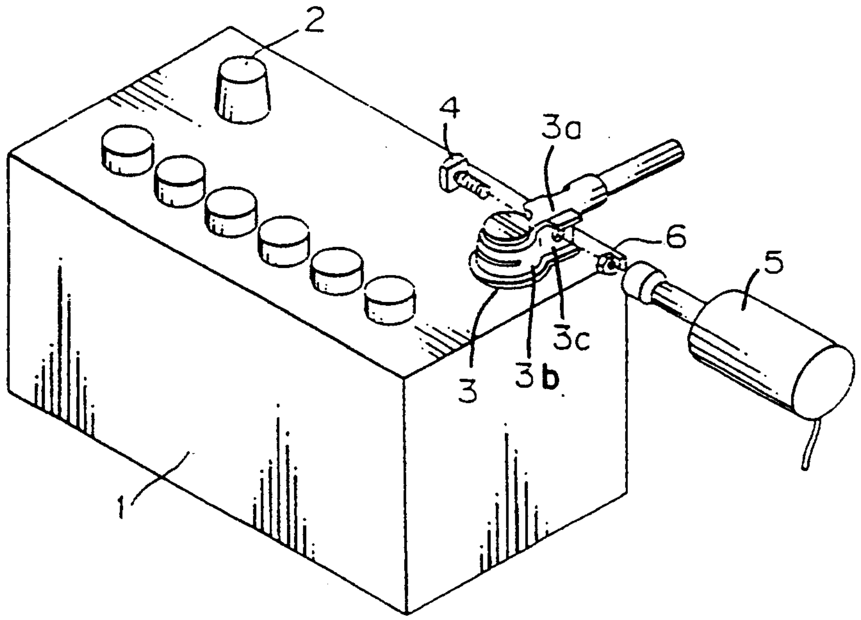
Fig. 6 PRIOR ART
FIG. 6 is a perspective view showing the state in which a conventional battery terminal has been fixed to a battery post.
Figure 7A:
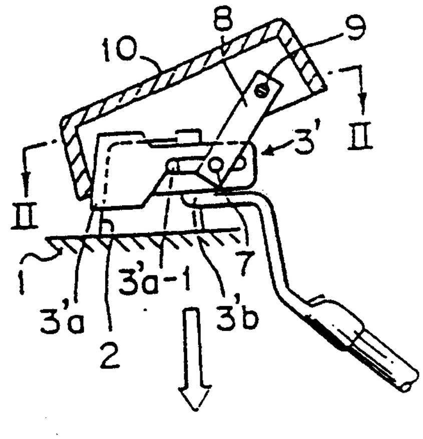
Fig. 7 A PRIOR ART
FIGS. 7A and 7B are respectively sectional views showing another conventional battery terminals.
Figure 7B:
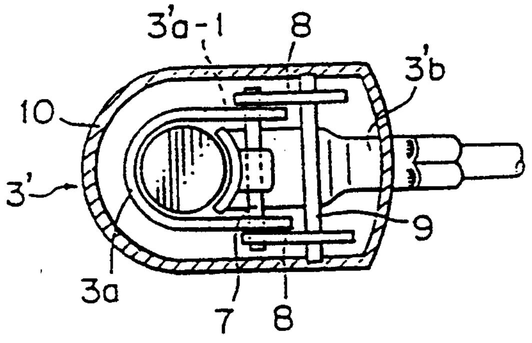
Fig. 7 B PRIOR ART

FIG. 5 shows a battery terminal 15' according to the second embodiment of the present invention. Similarly to the battery terminal 15 according to the first embodiment, the battery terminal 15' comprises an electrode-engaging portion 20', first and second tightening plates 24A' and 24B' continuous with the free end of the electrode-engaging portion 20', and an electric wire-connecting portion 28' disposed at the other side (closed side) of the electrode-engaging portion 20'.

The battery terminal 15' according to the second embodiment is different from that of the first embodiment in that the position of the electrode-engaging portion 28' is different from that of the electrode-engaging portion 28. Similarly to the first embodiment, the second tightening plate 24B' is pressed toward the first tightening plate 24A' by the lever 17' mounted at a position adjacent to the second tightening plate 24B'.

As described above, according to the battery terminal of the present invention, the lever is pivotally supported on the main body of the one-piece battery terminal. Only the pressing of the lever by hand allows the battery terminal to be fixed to the battery post under pressure. That is, unlike the conventional battery terminal, the battery terminal can be fixed to the battery post without using a tightening tool such as an impact wrench which may interfere with component parts and cause a short circuit.

Further, the battery terminal has a simple construction. That is, the main body of the battery terminal has a predetermined gap formed between the first and second tightening plates. The gap is narrowed by the pivotal motion of the lever. Accordingly, the battery terminal comprises a small number of component parts and can be assembled therefrom in a short period of time, and in addition, the electrode-engaging portion of the main body securely tightens the battery post under pressure.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A battery terminal comprising:

a main body comprising:

an annular electrode-engaging portion into which a battery post is inserted, said electrode-engaging portion having an open free end;

first and second tightening plates extending from said open free end of the electrode-engaging portion;

an electric wire-connecting portion extending from one of the first tightening plate, the second tightening plate, and a portion of the annular electrode-engaging portion;

a lever-holding portion being continuous with the first tightening plate and projecting toward the second tightening plate; and a lever which is pivotal about a pivotal axis and has a cam-shaped bearing portion which is supported on the lever-holding portion;

wherein the bearing portion of the lever has a curved first side and a straight second side, and an intersection between the first side and, the second side, the intersection being located rearwardly of a line to the second side and passing through the pivotal axis of the lever; the distance between the pivotal axis of the lever and the first side is shorter than the distance between the pivotal axis of the lever and the second side; and the straight second side presses the second tightening plate toward the first tightening plate in response to pivotal motion of the lever, thus closing the free end of the electrode-engaging portion and pressing the electrode-engaging portion against the battery post.

2. The battery terminal as defined in claim 1, wherein the lever-holding portion of the main body extends horizontally from upper and lower ends of the first tightening plate beyond upper and lower ends of the second tightening plate, and the lever is U-shaped in cross-section in one end portion thereof to form the bearing portion.

3. The battery terminal as defined in claim 1, wherein the bearing portion is inserted into a space between the lever-holding portion and supported on the lever-holding portion by means of a bolt and a nut so that the lever is pivotal about the bolt, said lever-holding portion having a curved first side disposed in a rear corner of the bearing portion and a second side adjacent to the first side.

4. The battery terminal as defined in claim 1, wherein a gap is provided between the first and second tightening plates when the first side is in contact with an outer vertical surface of the second tightening plate, and when the second side is brought into contact with the second tightening plate, the second tightening plate is pressed toward the first tightening plate.

5. The battery terminal as defined in claim 1, wherein after a battery post is inserted into the electrode-engaging portion of the main body, the lever is pressed to pivot the lever.

* * * * *